(12) United States Patent
Jeon et al.

(10) Patent No.: US 8,433,721 B2
(45) Date of Patent: Apr. 30, 2013

(54) APPARATUS AND METHOD FOR MANAGING IMAGES BASED ON USER PREFERENCES

(75) Inventors: Jae Wook Jeon, Suwon-si (KR); Gi Hoon Go, Suwon-si (KR); Min Kyung Kim, Suwon-si (KR); Hyun Uk Jung, Suwon-si (KR); Myung Jin Kim, Suwon-si (KR); Soon Mook Jung, Suwon-si (KR); Tae Houn Song, Chuncheon-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 206 days.

(21) Appl. No.: 12/713,229

(22) Filed: Feb. 26, 2010

(65) Prior Publication Data

US 2011/0191367 A1    Aug. 4, 2011

(30) Foreign Application Priority Data

Feb. 4, 2010    (KR) .................. 10-2010-0010254

(51) Int. Cl.
*G06F 7/00*    (2006.01)
*G06F 17/30*    (2006.01)

(52) U.S. Cl.
USPC ..................... 707/769; 707/780; 709/219

(58) Field of Classification Search .............. None
See application file for complete search history.

(56) References Cited

U.S. PATENT DOCUMENTS

| 6,331,861 | B1 * | 12/2001 | Gever et al. ................ 345/629 |
| 6,574,616 | B1 * | 6/2003 | Saghir ...................... 382/305 |
| 7,801,729 | B2 * | 9/2010 | Mozer ....................... 704/270 |
| 2008/0052312 | A1 * | 2/2008 | Tang et al. .................. 707/104.1 |
| 2008/0209014 | A1 * | 8/2008 | Anderson ................... 709/219 |
| 2009/0019392 | A1 * | 1/2009 | Nomura et al. .............. 715/810 |
| 2009/0164537 | A1 * | 6/2009 | Huang ....................... 707/205 |
| 2010/0280829 | A1 * | 11/2010 | Gopi et al. .................. 704/275 |
| 2011/0058056 | A1 * | 3/2011 | Lindahl et al. .............. 348/222.1 |
| 2011/0087666 | A1 * | 4/2011 | Chou et al. ................. 707/737 |

FOREIGN PATENT DOCUMENTS

| KR | 1020060029894 | 4/2006 |
| KR | 1020070016451 | 2/2007 |

* cited by examiner

*Primary Examiner* — Hosain Alam
*Assistant Examiner* — Azam Cheema
(74) *Attorney, Agent, or Firm* — Lexyoume IP Meister, PLLC.

(57) ABSTRACT

Disclosed herein is an apparatus and method for managing images based on user preferences. The apparatus includes a database for storing images, an image search module for searching the images stored in the database, an image output module for outputting at least one image retrieved by the image search module, a preference input module for, when the retrieved image is output through the image output module, receiving a user preference for the output image from a user, and an image path database for storing a storage path of the image, output through the image output module, based on the user preference received through the user preference input module. The image search module searches images whose storage paths are stored in the image path database or images whose storage paths are not stored in the image path database according to the user's selection.

10 Claims, 6 Drawing Sheets

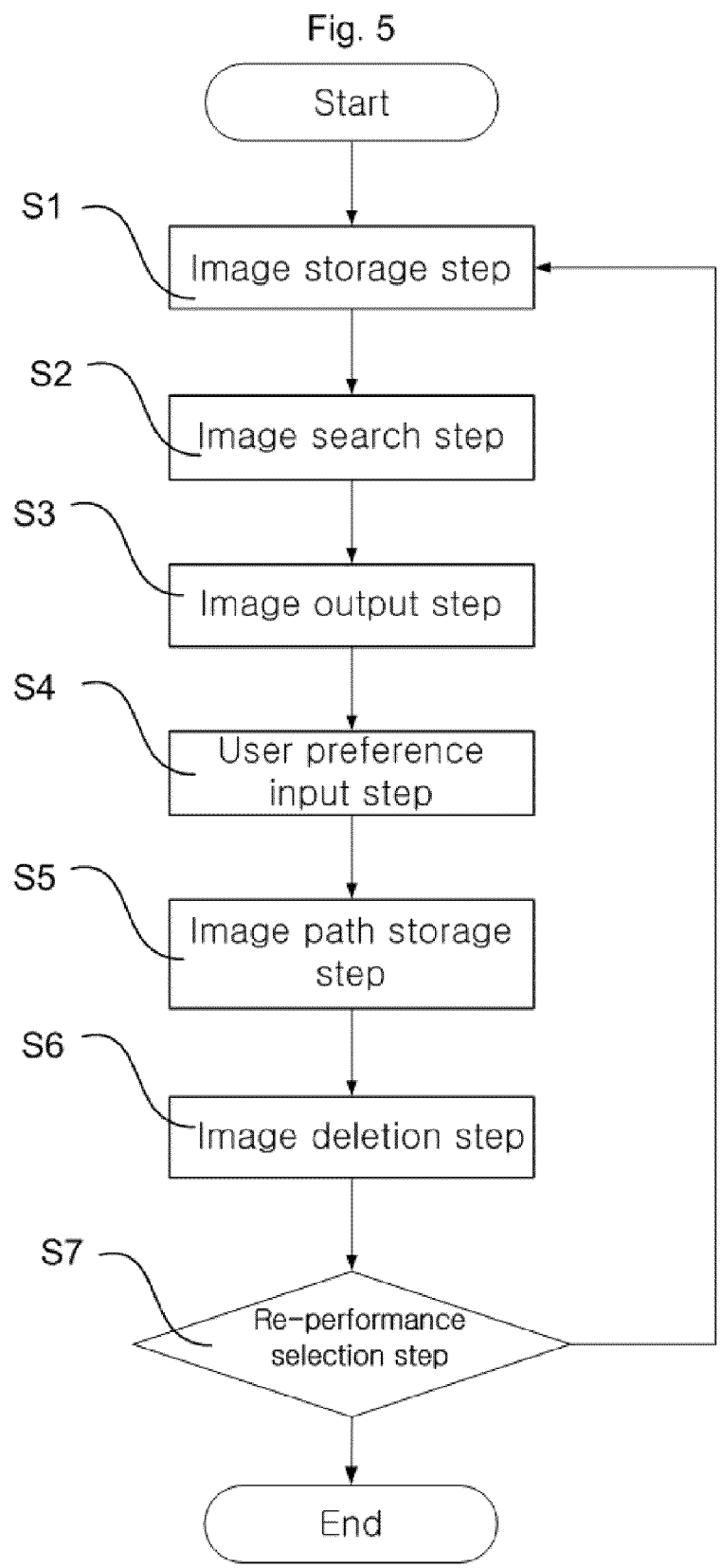

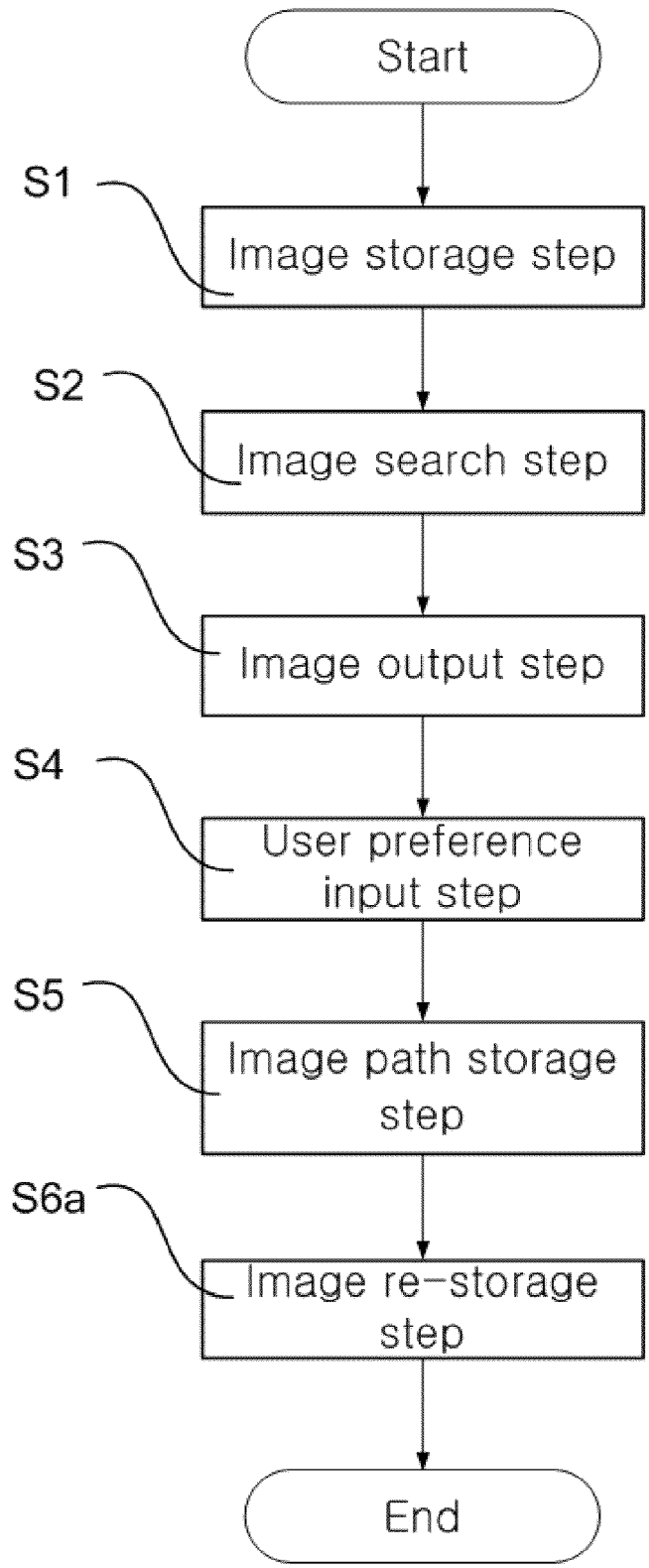

APPARATUS AND METHOD FOR MANAGING IMAGES BASED ON USER PREFERENCES

CROSS-REFERENCE TO RELATED APPLICATION

This application claims priority to and the benefit of Korean Patent Application No. 10-2010-0010254 filed in the Korean Intellectual Property Office on Feb. 4, 2010, the entire contents of which are incorporated herein by reference.

BACKGROUND OF THE INVENTION

1. Field of the Invention

The present invention relates generally to an apparatus and method for managing images based on user preferences, and, more particularly, to an apparatus and method for managing images based on user preferences, which is capable of classifying images stored in a database, based on user preferences.

2. Description of the Related Art

With the popularization of the use of digital devices for generating electronic images, such as digital cameras and digital camcorders, an enormous number of electronic images are created.

If an enormous number of the electronic images are not appropriately classified, a problem arises in that a user must use a lot of time and efforts to find a desired electronic image.

SUMMARY OF THE INVENTION

Accordingly, the present invention has been made keeping in mind the above problems occurring in the prior art, and an object of the present invention is to provide an apparatus and method for managing images based on user preferences, which is capable of more easily classifying electronic images, stored in a database, using the feedback of user preferences.

Another object of the present invention is to provide an apparatus and method for managing images based on user preferences, which is capable of more easily classifying electronic images, stored in a database, by classifying user preferences into grades.

Yet another object of the present invention is to provide an apparatus and method for managing images based on user preferences, which is capable of more easily classifying and using electronic images by storing classified images in a separate database.

In order to achieve the above objects, the present invention provides an apparatus for managing images based on user preferences, the apparatus including a database for storing images; an image search module for searching the images stored in the database; an image output module for outputting at least one image retrieved by the image search module; a preference input module for, when the retrieved image is output through the image output module, receiving a user preference for the output image from a user; and an image path database for storing a storage path of the image, output through the image output module, based on the user preference received through the user preference input module; wherein the image search module searches images whose storage paths are stored in the image path database or images whose storage paths are not stored in the image path database according to the user's selection.

The image search module may randomly search the images stored in the database.

The preference input module may include a touch signal reception unit for receiving a touch signal generated by the user; a memory unit for storing a user preference corresponding to the touch signal; and an input control unit for reading the user preference corresponding to the touch signal, received through the touch signal reception unit, from the memory unit.

The preference input module may include a voice reception unit for receiving the user's voice; a memory unit for storing a user preference corresponding to a pattern of the voice; and an input control unit for patterning the voice received through the voice reception unit, and reading the user preference corresponding to the voice pattern from the memory unit.

The preference input module may include a motion recognition unit for receiving the user's motion; a memory unit for storing a user preference corresponding to a pattern of the motion; and an input control unit for patterning the motion received through the motion recognition unit, and reading the user preference corresponding to the motion pattern from the memory unit.

The user preference stored in the memory unit may be classified as one of grades, and is then stored.

The image path database may classify the storage path of the image, output through the image output module, as one of grades based on a level of the user preference output through the input control unit At least one of the image output module and the preference input module may be connected via a wired or wireless connection.

The database may further include a database control unit for deleting an image, stored in the database, based on the user preference received through the preference input module.

The database control unit may store the images, whose storage paths are stored in the image path database, in another database and stores the storage paths of the images, which are stored in another database, in the image path database.

In order to achieve the above objects, the present invention further provides a method of managing images based on user preferences, the method including an image storage step of storing images in a database; an image search step of searching the images stored in the image storage step; an image output step of outputting at least one image retrieved at the image search step; a user preference input step of receiving a user preference for the output image from a user; and an image path storage step of storing a storage path of the image output at the image output step and determined to correspond to the user preference received at the user preference input step; wherein the image search step includes searching images whose storage paths are stored in the image path database or images whose storage paths are not stored in the image path database according to the user's selection.

The image search step may include randomly searching the images stored at the image storage step.

The user preference input step may include classifying the user preference as one of grades, and then receiving it.

The image path storage step may include classifying a storage path of the image, output at the image output step, as one of the grades based on a level of the user preference input at the user preference input step, and then storing it.

The image path storage step may further include an image deletion step of deleting a storage path corresponding to a specific grade from image storage paths classified into the grades and then deleting an image having the deleted storage path.

The image deletion step may further include a re-performance selection step for receiving an input of the user as to whether to repeatedly perform the image search step and then repeatedly performing or terminating the image search step based on the received input.

The method may further include an image re-storage step of sending the image whose storage path is stored at the image path storage step to another database and then storing the storage path in another database again.

BRIEF DESCRIPTION OF THE DRAWINGS

The above and other objects, features and advantages of the present invention will be more clearly understood from the following detailed description taken in conjunction with the accompanying drawings, in which:

FIG. 5 is a flowchart illustrating a method of managing images based on user preferences according to an embodiment of the present invention; and FIG. 6 is a flowchart illustrating a method of managing images based on user preferences according to another embodiment of the present invention.

DESCRIPTION OF THE PREFERRED EMBODIMENTS

An apparatus for managing images based on user preferences according to the present invention will be described in detail below with reference to the accompanying drawings.

Figure 1:
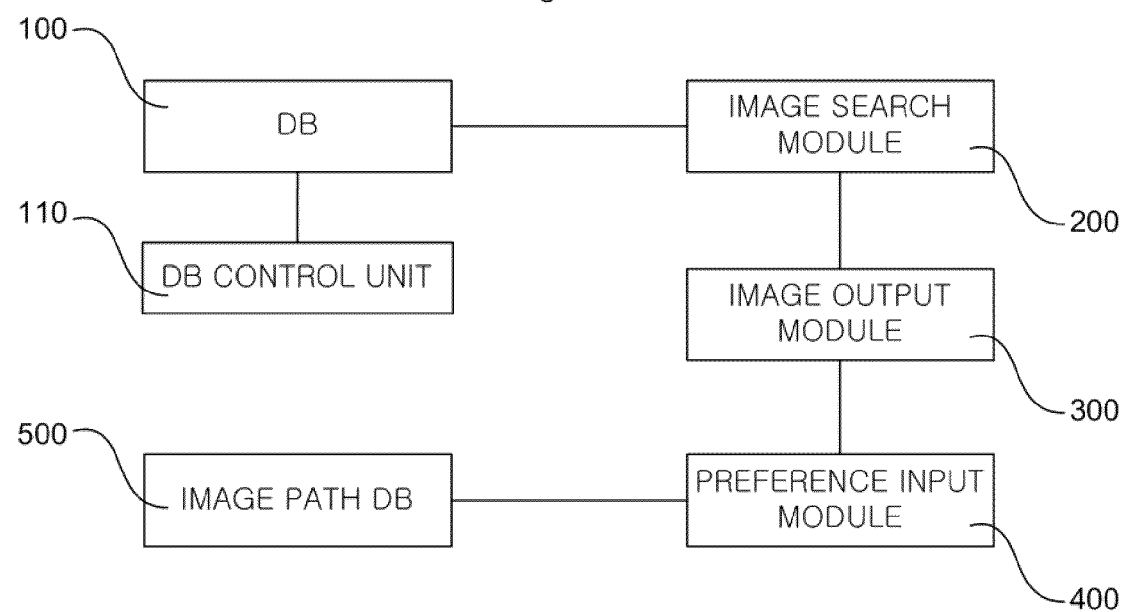
FIG. 1 is a block diagram showing an apparatus for managing images based on user preferences according to an embodiment of the present invention.
Figure 2:
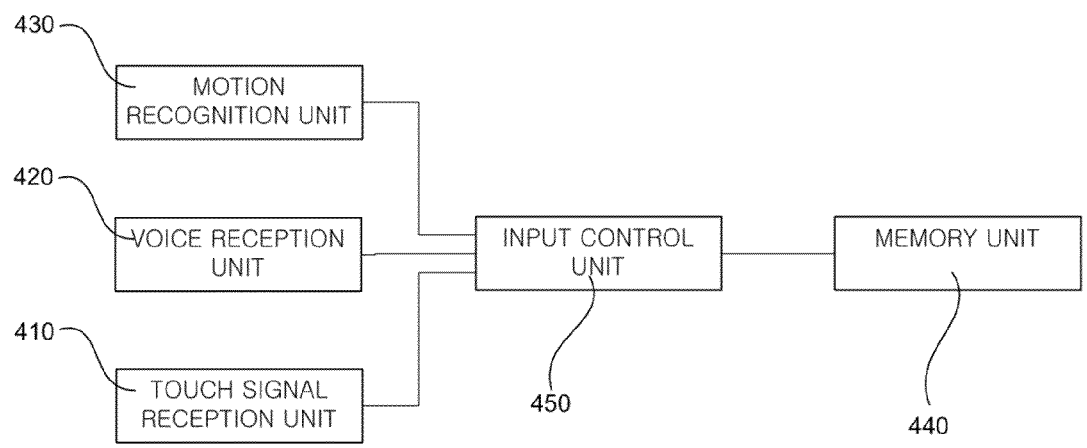
FIG. 2 is a block diagram showing the preference input module of FIG. 1.
Figure 3:
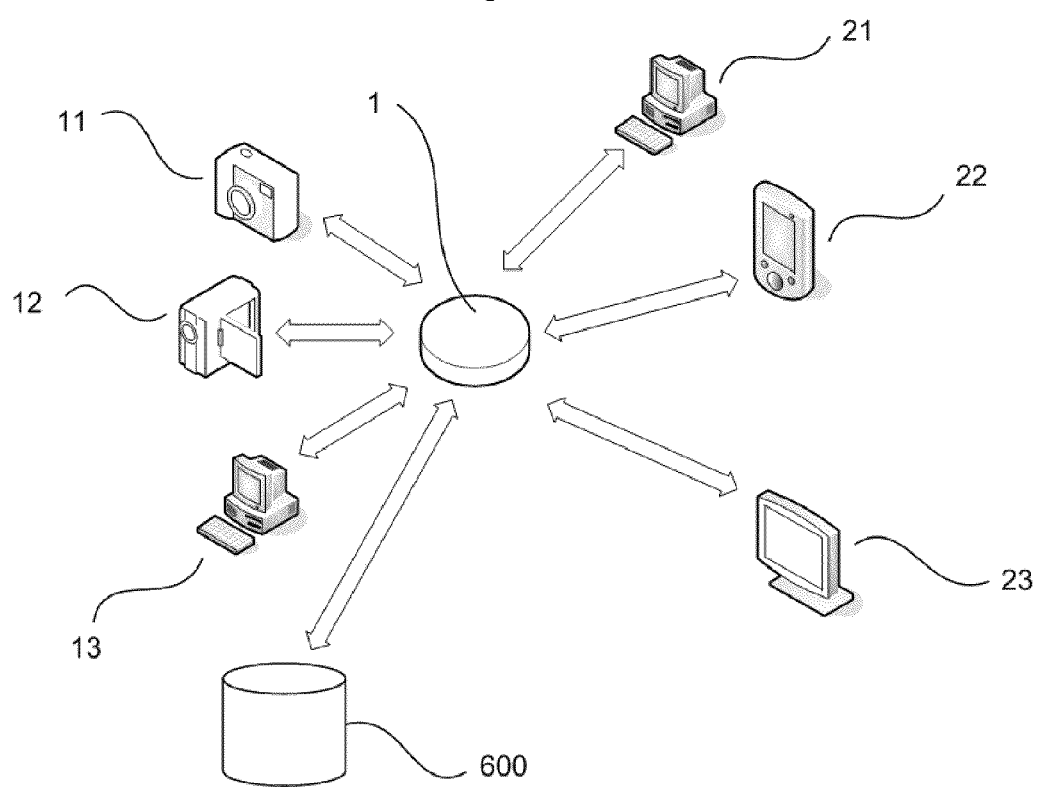
FIG. 3 is a conceptual diagram showing a network in which the apparatus for managing images based on user preferences according to the embodiment of the present invention is installed.

FIG. 1 is a block diagram showing an apparatus for managing images based on user preferences according to an embodiment of the present invention. FIG. 2 is a block diagram showing the preference input module of FIG. 1. FIG. 3 is a conceptual diagram showing a network in which the apparatus for managing images based on user preferences according to the embodiment of the present invention is installed.

The apparatus for managing images based on user preferences according to the present invention, as shown in FIG. 1, includes a database 100, an image search module 200, an image output module 300, a preference input module 400, and an image path database 500.

The database 100 of the present invention stores images. The database 100 may be a database which stores only images or a database which stores not only images but also the other types of data.

The database 100 may be installed in the same physical space, such as space within a computer, or may be connected over a network 1.

Furthermore, the database 100, as shown in FIG. 3, may be a camera 11, a camcorder 12 and/or a computer 13 which is connected over the network 1.

The image search module 200 of the present invention searches images stored in the database 100. The image search module 200 may sequentially or randomly search images stored in the database 100 according to a user's selection.

The image search module 200 may be installed via the network 1 or within the image output module 300.

The image output module 300 of the present invention outputs images retrieved by the image search module 200. As shown in FIG. 3, the image output module 300 may be a computer 21, a wireless terminal 22 and/or a digital picture frame 23 which are connected over the network 1.

The preference input module 400 of the present invention receives a user preference for an image from the user when the image is output through the image output module 300. The preference input module 400 may receive a user preference in the form of at least one of touch, voice and motion signals which are generated by a user.

In the case in which the preference input module 400 receives a user preference in the form of a touch signal, the preference input module 400 of the present invention includes a touch signal reception unit 410 for receiving a touch signal generated by the user, a memory unit 440 for storing the user preference corresponding to the touch signal, and an input control unit 450 for reading a user preference corresponding to the touch signal input from the memory unit 440, as shown in FIG. 2.

The touch signal reception unit 410 of the present invention receives a touch signal from a user, and may be configured in the form of a keyboard, such as a computer keyboard, or in the form of mechanical buttons. Alternatively, the touch signal reception unit 410 may be configured in the form of buttons which is displayed on a touch screen.

The memory unit 440 of the present invention stores user preferences corresponding to touch signals. In the case in which a user preference for an image output through the image output module 400 is received in the form of one of two grades, such as 'like' and 'dislike', the memory unit 440 stores the user preference input through the touch signal reception unit 410, on a grade basis. The stored user preference is read by the input control unit 450.

Furthermore, in the case in which the preference input module 400 receives a user preference in the form of voice, the preference input module 400 of the present invention includes a voice reception unit 420 for receiving a user's voice, the memory unit 440 for storing the user preference corresponding to the voice pattern, and the input control unit 450 for patterning the user voice input from the voice reception unit 420 and reading a user preference corresponding to the voice pattern from the memory unit 440, as shown in FIG. 2.

The voice reception unit 420 receives a voice signal from a user, and may generally be a microphone for converting a voice signal into an electrical signal.

The memory unit 440 stores a user's input received through the voice reception unit 420, in the form of a voice pattern. The voice pattern is converted by the input control unit 450, and is then stored in the memory unit 440.

The voice pattern converted by the input control unit 450 can be classified as one of two grades, such as 'like' and 'dislike'. Alternatively, the voice pattern may be classified as one of a wider variety of grades.

The input control unit 450 patterns voice received through the voice reception unit 420, stores the voice pattern in the memory unit 440, and reads a user preference corresponding to the voice pattern from the memory unit 440.

Furthermore, in the case in which the preference input module 400 receives a user preference in the form of a user motion, the preference input module 400 of the present invention includes a motion recognition unit 430 for receiving the motion of a user, the memory unit 440 for storing the user preference corresponding to the motion pattern, and the input control unit 450 for patterning the user motion received through the motion recognition unit 430 and reading a user preference corresponding to the motion pattern from the memory unit 440, as shown in FIG. 2.

The motion recognition unit 430 recognizes the motion of a user in the form of an image. The motion recognition unit 430 may generally be a camera, or an infrared sensor for sensing infrared rays generated by a human body.

The memory unit 440 stores the motion of a user which is received through the motion recognition unit 420 and then converted into a motion pattern by the input control unit 450. The motion pattern is converted by the input control unit 450, and is then stored in the memory unit 440.

The motion pattern converted by the input control unit 450 may be classified as one of two grades, such as 'up and down rotation' or 'left and right rotation,' or may be classified as one of a wider variety of grades.

The input control unit 450 patterns the motion of a user received through the motion recognition unit 430, stores the motion pattern in the memory unit 440, and reads a user preference corresponding to the motion pattern from the memory unit 440.

The image path database 500 of the present invention stores the storage path of an image, output through the image output module 300, based on the user preference input through the user preference input module 400. The image path database 500 may be connected over the network 1 or exist in the same physical space, like the database 100.

The apparatus for managing images based on user preferences outputs images, stored in the image path database 500, to the image output module 300 through the image search module 200, receives user preferences for the images input by the user, and distinguishes the images from each other based on the user preferences. Accordingly, the images stored in the database 100 can be classified more conveniently.

The image search module 200 may repeatedly perform a task of classifying images by searching for images whose storage paths are stored in the image path database 500 or images whose storage paths are not stored in the image path database 500 according to a user's selection.

The image output module 300 and the preference input module 400 will be described in more detail below with reference to FIG. 4 which shows embodiments of the image output module and the preference input module according to the present invention.

The image output module 400, as shown in FIG. 3, may be the computer 21, the portable terminal 22, or the digital picture frame 23. FIG. 4 illustrates the digital picture frame 23 as an example of the image output module 400.

The illustrated digital picture frame 23 is a touch pad-type digital picture frame. The touch signal reception unit 410 which displays a total of five user preference grades is formed in the panel of the digital picture frame 23. The user preference grades may be modified in various ways, as described above.

Furthermore, the voice reception unit 420 is formed in a frame which surrounds the panel of the digital picture frame 23. The motion recognition units 430 are respectively installed in the left, right, upper, and lower frame parts.

Figure 4:
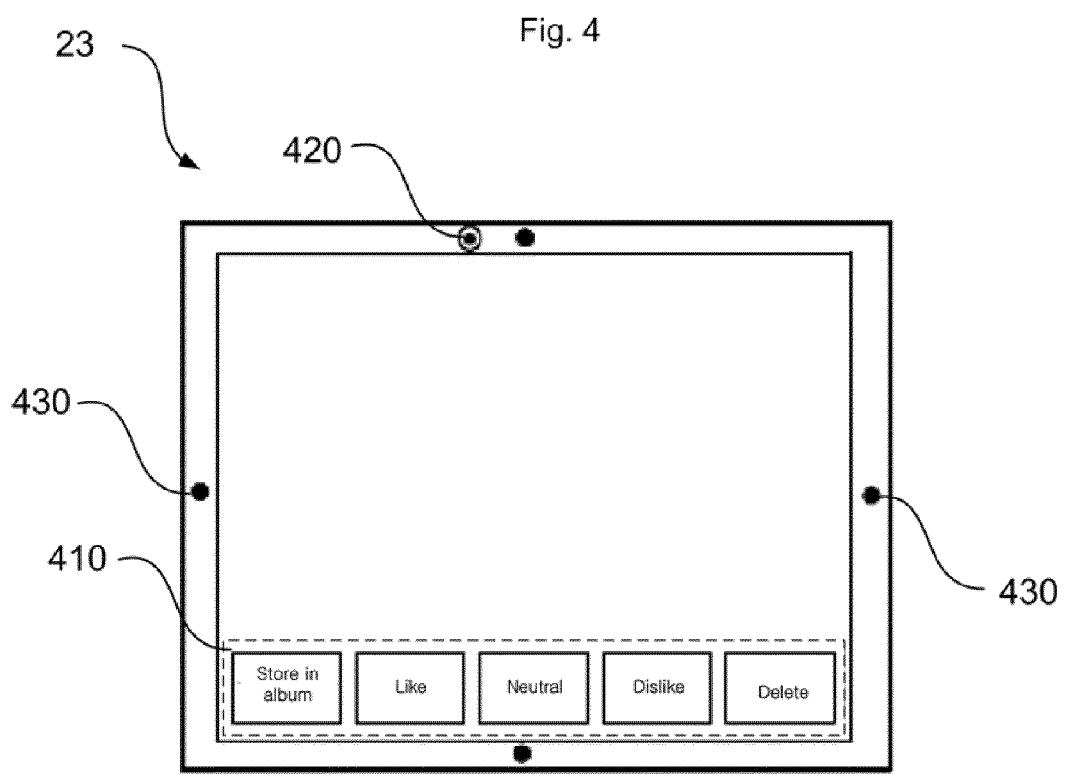
FIG. 4 is a diagram showing an embodiment of the image output module and the preference input module shown in FIG. 1.

When the touch signal reception unit 410 includes five grades as shown in FIG. 4, user preferences stored in the memory unit 440 are classified into the grades of the touch signal reception unit 410, and are then stored. The image path database 500 classifies the storage paths of images, output through the image output module 300, into grades based on the levels of user preferences output through the input control unit 450, and stores them.

That is, when user preferences have grades such as 'store in album', 'like', 'neutral', 'dislike' and 'delete', the memory unit 440 and the image path database 500 classify user preferences and the storage paths of images stored in the database 100 based on the five grades, and store classification results.

The database 100 may further include a database control unit 110 for deleting images, stored in the database 100, based on user preferences received through the preference input module 400.

That is, when a user views an image output through the image output module 300 and enters the grade 'delete' in the touch signal reception unit 410, the database control unit 110 may delete the corresponding image stored in the database 100.

When a user views an image output through the image output module 300 and enters the grade 'store in album' in the touch signal reception unit 410, the database control unit 110 stores an image, which belongs to images whose storage paths are stored in the image path database 500 and corresponds to the grade 'store in album', in the other database 600. The storage paths of images stored in the other database 600 may be stored in the image path database 500.

Here, the other database 600 may be an external storage medium, such as a blog or web storage connected over a network. Alternatively, the other database 600 may be storage having another storage path within the database 100. If a plurality of the databases 100 is included, the other database 600 may be an adjacent database.

The image output module 300 and preference input module 400 of the apparatus for managing images based on user preferences may be wirelessly connected to the image search module 200. In some embodiments, at least one of the image output module 300 and the preference input module 400 may be wirelessly connected to the image search module 200.

A method of managing images based on user preferences according to an embodiment of the present invention will be described below with reference to FIG. 5.

The method of managing images based on user preferences according to the embodiment of the present invention may include an image storage step S1, an image search step S2, an image output step S3, a user preference input step S4, and an image path storage step S5.

At the image storage step S1 of the present invention, images are stored in the database 100. As described above, images input through devices, such as the camera 11, the camcorder 12 and the computer 13, are stored in the database 100.

Since the database 100 for storing the images has been described above, a detailed description thereof will be omitted here.

At the image search step S2 of the present invention, the images stored at the image storage step S1 are searched. The images stored in the database 100 may be sequentially searched. However, in the present embodiment, the images stored in the database 100 at the image storage step S1 are randomly searched.

At the image output step S3 of the present invention, the images retrieved at the image search step S2 are output. The retrieved images are output through the computer 21, the portable terminal 22 and/or the digital picture frame 23, as shown in FIG. 3.

At the user preference input step S4 of the present invention, a user preference for each of the images output at the image output step S3 is received by receiving at least one of a motion, a voice and a touch signal which are generated by a user.

At the image path storage step S5 of the present invention, the storage path of the image which is output at the image output step S3 and which corresponds to the user preference input at the user preference input step S4 is stored. Since the image path storage step S5 has been described above in conjunction with the image path database 500, a detailed description thereof will be omitted here.

At the image search step S2 of the method of managing images based on user preferences, it is preferred that images whose storage paths are stored at the image path storage step S5 or images whose storage paths are not stored at the image path storage step S5 be searched according to a user's selection.

At the user preference input step S4 of the present invention, user preferences may be classified into grades, and are then received. In this case, at the image path storage step S5, the storage paths of images output at the image output step S3 are classified into the grades of the user preferences input at the user preference input step S4, and are then stored.

The image path storage step S5 of the present invention may further include an image deletion step S6 of deleting a storage path corresponding to a specific from the storage paths classified into the grades and deleting an image having the deleted storage path.

The image deletion step S6 of the present invention may further include a re-performance selection step S7 of receiving a user's input as to whether to repeatedly perform the image search step S2 and repeatedly performing or terminating the image search step S2 based on the user's input.

Accordingly, if the user selects the repetitive performance of the image search step S2, the image search step S2 is repeatedly performed. However, if the user does not select the repetitive performance of the image search step S2, the process is terminated.

A method of managing images based on user preferences according to another embodiment of the present invention will be described below with reference to FIG. 6.

The method of managing images based on user preferences according to another embodiment of the present invention includes an image storage step S1, an image search step S2, an image output step S3, a preference input step S4, an image path storage step S5, and an image re-storage step S6a.

Since the image storage step S1, the image search step S2, image output step S3, preference input step S4 and image path storage step S5 of the present embodiment have been described above, only the image path storage step S5 will be described below.

At the image re-storage step S6a of the present embodiment, an image whose storage path has been stored at the image path storage step S5 is sent to the other database 600, and the storage path of the image in the other database 600 is stored again. When an image corresponds to a specific one (for example, the grade 'store in album' in FIG. 4) of the preference grades input at the preference input step S4, the image corresponding to the specific preference grade is sent to the other database 600 and the storage path of the image in the other database 600 is stored again.

As described above, the apparatus and method for managing images based on user preferences according to the present invention has the advantage of classifying electronic images stored in the database, based on user preferences using the image search module. Furthermore, the apparatus and method for managing images based on user preferences according to the present invention has the advantage of more finely classifying the electronic images stored in a database by classifying the preferences into grades. Furthermore, the apparatus and method for managing images based on user preferences according to the present invention has the advantage of enabling the classified images to be more easily used by storing them in the separate database.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for managing images based on user preferences, the apparatus comprising:
   a memory having stored therein a database for storing a plurality of images;
   an image search module for randomly searching the plurality of images stored in the database and for retrieving a randomly selected image from the database;
   a display configured to output the randomly selected image;
   a preference input module for receiving a user preference associated with the randomly selected image from a user when the randomly selected image is output on the display, wherein the user preference is a classification into at least one of a plurality of user preference grades, wherein the plurality of user preference grades includes a "like" classification, a "neutral" classification, and a "dislike" classification; and
   an image path database for creating a storage path of the randomly selected image, wherein (a) the storage path is at least partially based on the user preference received through the preference input module, and (b) the image path database classifies the storage path of the image as one of a plurality of storage path grades based on the user preference;
   wherein the image search module searches for images whose storage paths are stored in the image path database or searches for images whose storage paths are not stored in the image path database according to a searching selection of the user.

2. The apparatus as set forth in claim 1, wherein the preference input module comprises:
   a touch signal reception unit for receiving a touch signal generated by the user;
   a memory unit for storing a plurality of user preference classifications; and
   an input control unit for reading a selected user preference classification corresponding to the touch signal, from the memory unit.

3. The apparatus as set forth in claim 1, wherein the preference input module comprises:
   a voice reception unit for receiving a vocal signal generated by the user
   a memory unit for storing a plurality of user preference classifications; and
   an input control unit for patterning the vocal signal received through the voice reception unit, and reading a selected user preference classification corresponding to the vocal signal from the memory unit.

4. The apparatus as set forth in claim 1, wherein the preference input module comprises:
   a motion recognition unit for receiving a motion signal generated by the user;
   a memory unit for storing a plurality of user preference classifications; and
   an input control unit for patterning the motion signal received through the motion recognition unit, and reading a selected user preference classification corresponding to the motion signal from the memory unit.

5. The apparatus as set forth in claim 1, wherein the database further comprises a database control unit for deleting an image designated for deletion, based on the user preference received through the preference input module.

6. The apparatus as set forth in claim 5, wherein the database control unit stores the storage paths of the images in the image path database.

7. A method of managing images based on user preferences, the method comprising:

storing a plurality of images in a database;

randomly searching the plurality of images;

outputting a randomly-selected image retrieved from the database;

receiving a user preference corresponding to the randomly-selected image, wherein the user preference is a classification into at least one of a plurality of user preference grades, wherein the plurality of user preference grades includes a "like" classification, a "neutral" classification, and a "dislike" classification;

creating a storage path for the randomly-selected image that is at least partially based on the user preference;

storing the storage path of the randomly-selected image in an image path database; and classifying the storage path of the randomly-selected image as one of a plurality of storage path grades based on the user preference;

wherein outputting the randomly-selected image comprises searching for images whose storage paths are stored in the image path database or searching for images whose storage paths are not stored in the image path database according to a user's searching selection.

8. The method as set forth in claim 7, further comprising:

deleting a storage path corresponding to a selected storage path grade; and deleting an image corresponding to the selected storage path grade.

9. The method as set forth in claim 8, further comprising receiving a user input as to whether to repeatedly search the plurality of images.

10. The method as set forth in claim 7, further comprising sending the randomly-selected image to a second database and storing the storage path in the second database.

* * * * *